US008548986B2

(12) United States Patent  
Surna et al.

(10) Patent No.: US 8,548,986 B2
(45) Date of Patent: Oct. 1, 2013

(54) ADAPTIVE ROW-BATCH PROCESSING OF DATABASE DATA

(75) Inventors: Aleksandras Surna, Redmond, WA (US); Per-Ake Larson, Redmond, WA (US); Srikumar Rangarajan, Sammamish, WA (US)

(73) Assignee: Microsoft Corporation, Redmond, WA (US)

( * ) Notice: Subject to any disclaimer, the term of this patent is extended or adjusted under 35 U.S.C. 154(b) by 193 days.

(21) Appl. No.: 12/727,235

(22) Filed: Mar. 19, 2010

(65) Prior Publication Data

US 2011/0231389 A1    Sep. 22, 2011

(51) Int. Cl.
*G06F 17/30*    (2006.01)
(52) U.S. Cl.
USPC .......................................................... 707/718
(58) Field of Classification Search
USPC .......................................................... 707/718
See application file for complete search history.

(56) References Cited

U.S. PATENT DOCUMENTS

| | | | | |
|---|---|---|---|---|
| 5,615,361 | A * | 3/1997 | Leung et al. | 707/714 |
| 6,581,055 | B1 * | 6/2003 | Ziauddin et al. | 1/1 |
| 2005/0076024 | A1 * | 4/2005 | Takatsuka et al. | 707/3 |
| 2009/0210445 | A1 | 8/2009 | Draese et al. | |
| 2009/0254532 | A1 | 10/2009 | Yang et al. | |
| 2010/0011031 | A1 | 1/2010 | Huang et al. | |
| 2011/0060731 | A1 * | 3/2011 | Al-Omari et al. | 707/718 |
| 2011/0131199 | A1 * | 6/2011 | Simon et al. | 707/714 |

OTHER PUBLICATIONS

An, Mingyuan., "Column-Based RLE in Row-Oriented Database", Retrieved at << http://ieeexplore.ieee.org/Xplore/login.jsp?url=http%3A%2F%2Fieeexplore.ieee.org%2Fstamp%2Fstamp.jsp%3Ftp%3D%26arnumber%3D5342213%26isnumber%3D5342137&authDecision=-203 >>, Oct. 11, 2009.
Schaffner, et al., "A Hybrid Row-Column OLTP Database Architecture for Operational Reporting", Retrieved at <<http://epic.hpi.uni-potsdam.de/pub/Home/Sapphire09/p7-schaffner.pdf >>, 2008.
Harizopoulos, et al.,"Performance Tradeoffs in Read-Optimized Database", , Retrieved at << http://nms.csail.mit.edu/~stavros/pubs/vldb2006.pdf >>, Proceedings of the 32nd international conference on Very large data bases very Large Data Bases , Sep. 15, 2006.
Halverson, et al., "A Comparison of C-Store and Row-Store in a Common Framework", Retrieved at << http://pages.cs.wisc.edu/~alanh/tr.pdf >>, Proceedings of the 32nd VLDB Conference, 2006.

* cited by examiner

*Primary Examiner* — Isaac M Woo
*Assistant Examiner* — Alexander Khong
(74) *Attorney, Agent, or Firm* — Zete Law, P.L.L.C.; MacLane C. Key

(57) ABSTRACT

Architecture that provides for greater interoperability between column stores and row stores by leveraging the advantages both have to offer. The architecture operates automatically (e.g., dynamically) to move between row oriented processing mode and batch processing mode, and the combination thereof, when it is more beneficial to run in one mode relative to the other mode, or both modes. The auto-switching of data processing between batch and row oriented mode occurs during the execution of a single query. The architecture can automatically modify an operator in the query tree and/or remove an operator if desired at runtime for more efficient processing. This approach also accounts for memory constraints for either of row or column processing.

20 Claims, 6 Drawing Sheets

ADAPTIVE ROW-BATCH PROCESSING OF DATABASE DATA

BACKGROUND

Traditional query processors have favored dealing with data that does not fit in faster main memory, but is stored on slower mass storage devices. However, it is expensive in terms of performance to process large volumes of data from a hard disk. With the evolution in hardware capabilities of computers, the operating system and hardware now support larger capacities in the faster main memory thereby allowing the storage of tables completely in memory.

In order to efficiently process data, the location of the data needs to be taken into consideration. A typical data warehouse query involves querying data in one large table called a fact table and a group of smaller tables called dimension tables. Typically, during processing, the data from each dimension table are stored in a hash table in memory. If the dimension hash tables do not fit in memory the data in the fact table is repartitioned and the processing is performed partition by partition. If the hash tables fit into memory then there is no need to repartition the fact table as the hash tables can be easily accessed by other threads in a multiprocessing environment. Not having to repartition the data is especially beneficial with batched processing because moving batches across various threads is much slower.

However, in systems with multiple types of data stores the query processor has no influence on the storage schema of the tables involved in a query. Therefore, the query processor needs to be able to accommodate disparate types of data stores where data may be stored column-wise or row-wise.

SUMMARY

The following presents a simplified summary in order to provide a basic understanding of some novel embodiments described herein. This summary is not an extensive overview, and it is not intended to identify key/critical elements or to delineate the scope thereof. Its sole purpose is to present some concepts in a simplified form as a prelude to the more detailed description that is presented later.

The disclosed architecture provides is technique for greater interoperability between column stores and row stores (e.g., in relational data systems) by leveraging the advantages both have to offer. Moreover, the architecture operates automatically (e.g., dynamically) to move between row oriented processing mode and batch processing mode, and the combination thereof, when it is beneficial to run in one mode relative to the other mode, or both modes. The auto-switching of data processing between batch and row oriented mode occurs during the execution of a single query.

Additionally, the architecture can automatically (e.g., dynamically) modify an operator in the query tree and/or remove an operator if desired at runtime for more efficient processing. This approach also accounts for memory constraints for either of row or batch processing.

To the accomplishment of the foregoing and related ends, certain illustrative aspects are described herein in connection with the following description and the annexed drawings. These aspects are indicative of the various ways in which the principles disclosed herein can be practiced and all aspects and equivalents thereof are intended to be within the scope of the claimed subject matter. Other advantages and novel features will become apparent from the following detailed description when considered in conjunction with the drawings.

DETAILED DESCRIPTION

Figure 1:
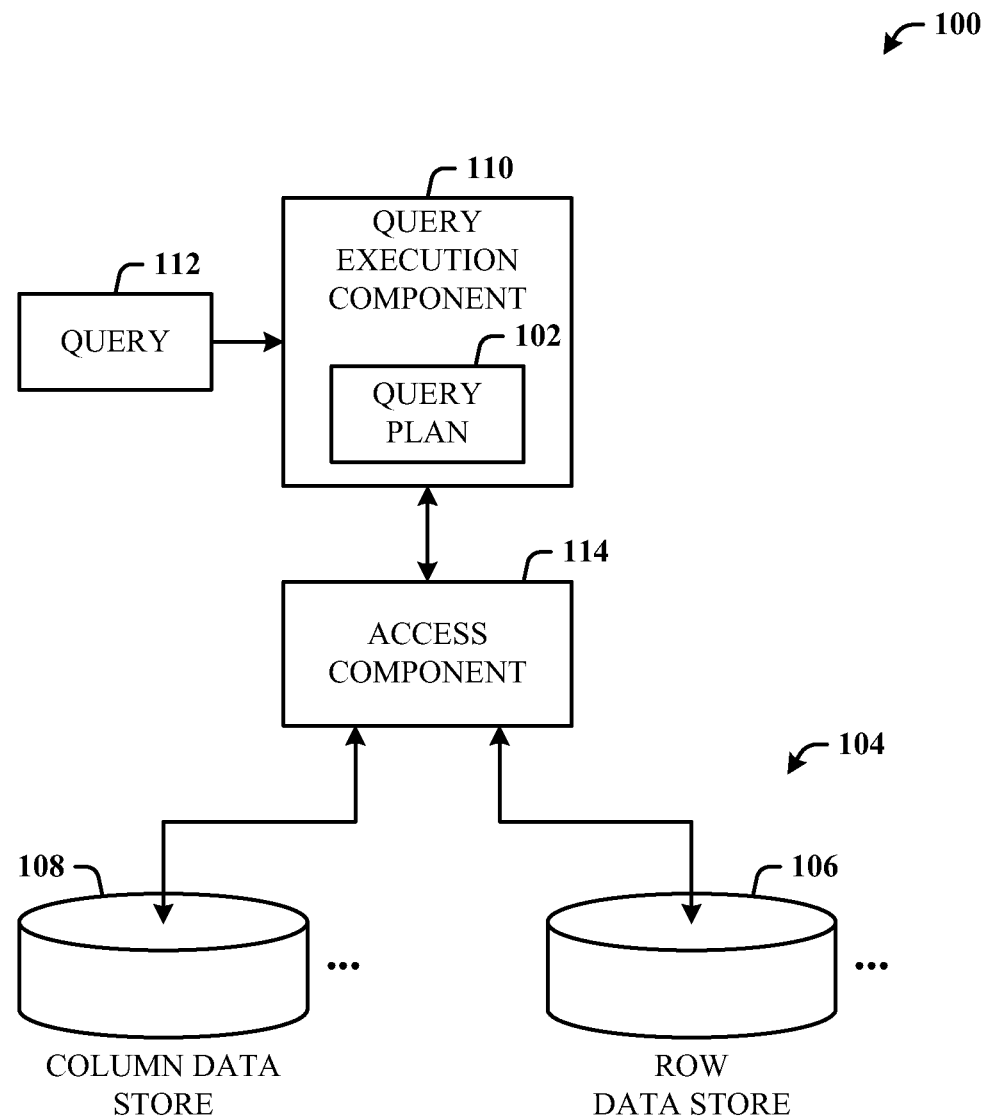
FIG. 1 illustrates a computer-implemented query system in accordance with the disclosed architecture.

The disclosed architecture allows for interoperability of data stored in the traditional row format and column format. Additionally, auto-switching can be performed between mixing batched (column-wise) and row-wise processing in query plans in a flexible manner. This allows the selection of the interim formats as well as the overall output format. Thus, it is now possible to operate only in row-wise processing to output in a row format, operate only in column-wise processing to output in a column format, and in a combination of row-wise and column-wise processing to output in either the row format or the column format. As is described in detail herein, this can also take into consideration system storage capabilities as well.

Moreover, the architecture includes the logic to strip out expensive operators (e.g., repartitioning) utilized to partition data between various executing sub-threads of a query plan. Operators in the query plan have the ability to support both column and row processing at a time when processing requires tight integration between the two types of processing. Only when a query plan is executed can a determination be made as to whether the data required by the query fits in memory. The amount of memory available for a query varies due to the varying load on the system. In order to partition the data, the logic is built into the execution plan at compile time and the switch between the query plans is done at runtime.

Post compilation, the execution plan is analyzed to identify operators that can be safely removed if the data can fit in-memory, and then the operators are tagged. At execution time, the tagged operators can be safely removed. Note that as a consequence of operator removal, remaining operators may start functioning in different ways. For example, before repartitioning operators have been removed, an operator may have worked in row-wise processing mode, whereas after removal, in column-wise processing mode. In one implementation, the architecture can be part of execution of queries coded in SQL (structured query language).

Reference is now made to the drawings, wherein like reference numerals are used to refer to like elements throughout. In the following description, for purposes of explanation, numerous specific details are set forth in order to provide a thorough understanding thereof. It may be evident, however, that the novel embodiments can be practiced without these specific details. In other instances, well known structures and devices are shown in block diagram form in order to facilitate a description thereof. The intention is to cover all modifications, equivalents, and alternatives falling within the spirit and scope of the claimed subject matter.

FIG. 1 illustrates a computer-implemented query system 100 in accordance with the disclosed architecture. The system 100 includes a query plan 102 for execution against data stores 104 that include row data stores 106 and column data stores 108, and a query execution component 110 (e.g., query execution engine) that controls execution of the query plan 102 to switch between row-wise processing and column-wise processing based on the data stores 104 accessed as part of query plan execution. The query plan 102 is created based on a query 112 received by the query execution component 110. The data stores 104 can be accessed by an access component 114 that provide suitable data access capabilities for the corresponding data store types.

The query execution component 110 switches between row-wise processing and column-wise processing during plan execution to output query results in a column format. Optionally, the query execution component 110 switches between row-wise processing and column-wise processing during plan execution to output query results in a row format. The query execution component 110 dynamically modifies the query plan 102 or removes an operator in the query plan 102 at runtime based on an amount of data associated with plan execution at stages of execution. The query execution component 110 defaults to row-wise processing of the query plan 102 and switches to column-wise processing based on data storage format of the data stores 104 accessed as part of processing the query plan 102. The query execution component 110 can modify an operator of the query plan 102 to optimize query execution performance for a given data store.

Additionally, the query execution component 110 analyzes the query execution plan 102 after compilation to identify one or more candidate query operators for removal. The query execution component 110 determines memory capabilities to execute the query plan 102 in memory and switches between related query plans based on available memory. The query plan 102 is modified to remove one or more repartitioning operators based on data tables and associated hash tables fitting into memory.

Note that although depicted as monitoring data stores indirectly via the access component 102, an alternative implementation can allow the query execution component 110 to interact with the data stores 104 directly.

Figure 2:
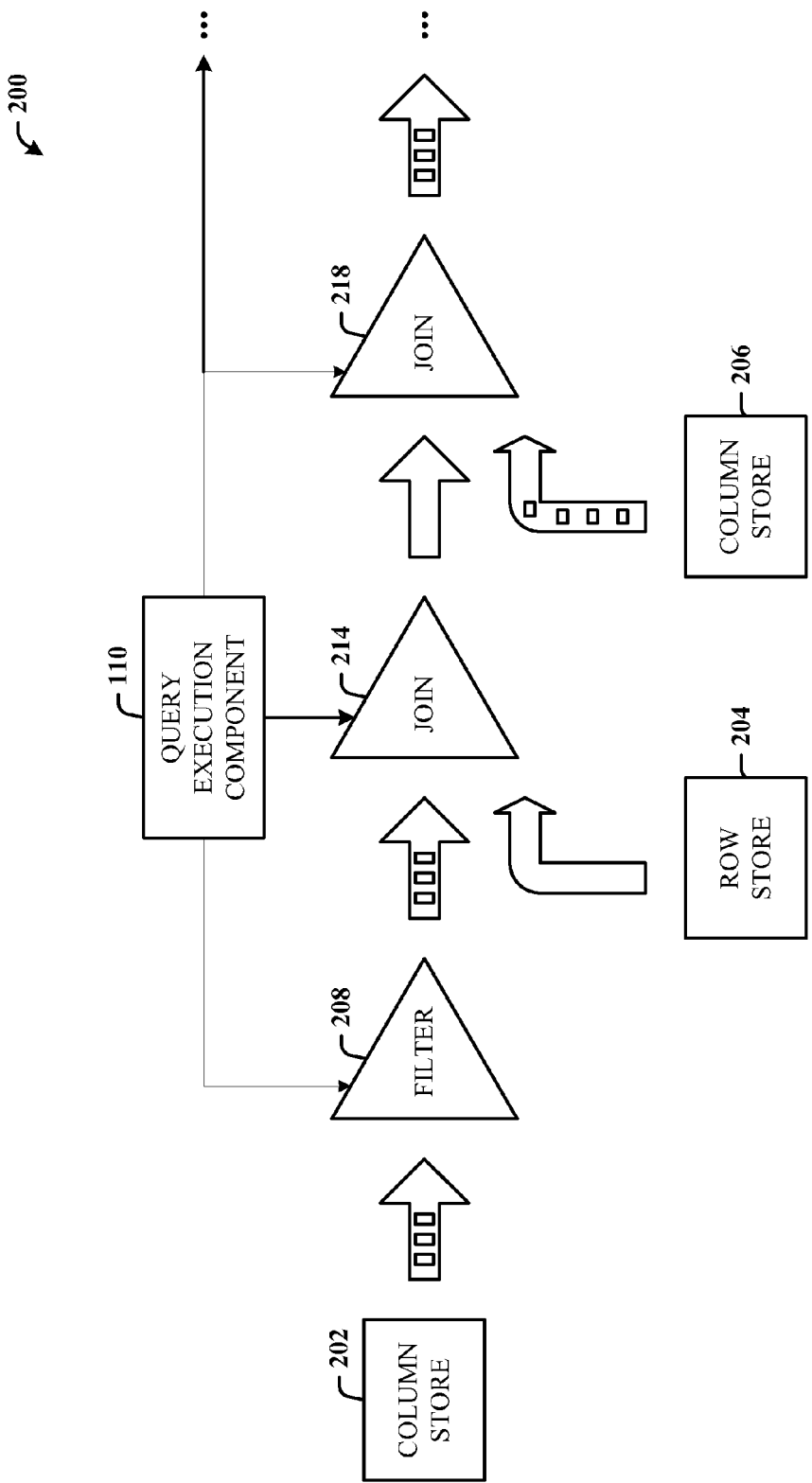
FIG. 2 illustrates one example of a query plan that can be manipulated by the query execution component for improved execution performance based on resources.

FIG. 2 illustrates one example of a query plan 200 that can be manipulated by the query execution component 110 (e.g., query engine) for improved execution performance based on resources. Here, the plan 200 involves a first column (column-wise) store 202, a row (row-wise) store 204, and a second column store 206. The query plan 200 is generated based on the query includes accessing the different data stores. Note that the first column store 202 and second column store 206 can be the same store or different stores.

As illustrated, a part of the query plan 200 can operate in batch oriented mode and another part of the plan can operate in row oriented mode. The decision as to the mode (or modes) in which to operate is made dynamically at runtime based on one or more criterion (e.g., available resources such as memory space, mass storage space, exact type of operator, etc.). For example, different join operators may vary in functionality such that a particular join operator may only be implemented in row processing mode, but not in batch processing mode.

The plan 200 begins with the access of data from the first column store 202, which is then passed through a filter 208 (e.g., equality filter, bitmap filter, etc.). The query execution component 110 controls access to the first column store 202 and informs the filter operator 208 that its input is in batched format and instructs it to produce its output in batched format (indicated by the strobe characters in the flow arrow). The output of the filter 208 then flows into join operator 214 where it is joined with the data in row store 204. The execution component 110 informs join operator 214 that its first input is on batched format and its second input in row format and instructs it to produce output in row format. This is a case of mixed-mode processing where some of the data is in row format and some in batched format.

The output of the first join operator 214 flows into a second join operator 218 where it is joined with data from the second column store 206. The execution component 110 informs join operator 218 that its first input is in row format and its second input in batched format and instructs it to produce output in batched format. This can be the end of the plan 200, or it may continue with further processing.

Put another way, a computer-implemented query system is provided having that comprises a query plan for execution against data stores that include row data stores and column data stores, and a query execution component that controls execution of the query plan to switch between row-wise processing and column-wise processing at runtime based on available memory as part of query plan execution. The query execution component defaults to row-wise processing of the query plan and switches to column-wise processing based on memory available to accommodate column-wise processing of the query plan.

The query execution component switches between row-wise processing and column-wise processing during plan execution to output query results in a column format or a row format. The query execution component dynamically modifies the query plan or removes an operator in the query plan at runtime based on an amount of data associated with query plan execution at stages of execution. The query execution component analyzes the query execution plan after compilation to identify one or more query operators for removal, and removes one or more repartitioning operators based on data tables and associated hash tables fitting into memory.

Figure 3:
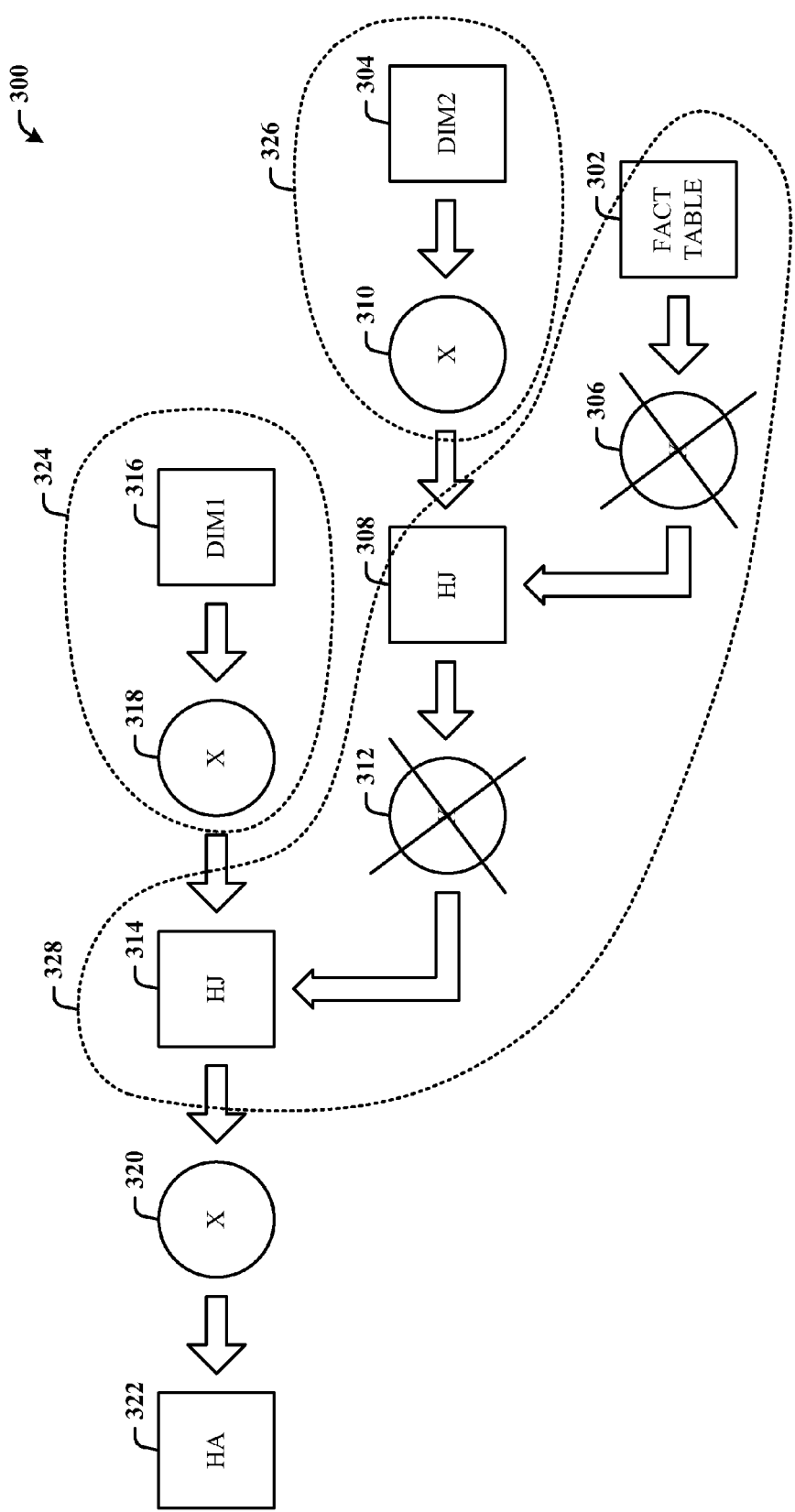
FIG. 3 illustrates dynamic removal of operators in a query plan for faster query evaluation.

FIG. 3 illustrates dynamic removal of operators in an example query plan 300 for efficient query evaluation. In order to efficiently process the data the store locations need to be taken into consideration. Operators are not removed arbitrarily. Execution is done by a tree of operators, and data flows between the operators that operate either on data in column format or row format. Column format takes batches of rows and organizes data in a row format. Row format passes one row at a time to the next operator.

In this example, there are generally two types of operators: operators that operate on the data such as a filter operator that can eliminate some of the rows and a join operator that takes two inputs and joins (e.g., hash joins) the inputs into a single output stream. For the hash join to work, one of its inputs has to fit entirely into memory in order to build the hashtable from the input while in memory. In the plan 300, the circles are data repartitioning operators, which can sometimes be eliminated. Elimination is determined by whether data can be fit entirely into memory for processing, in contrast to the data not fitting into memory. If the data fits entirely into memory, no repartitioning is needed, and the repartitioning operator can be eliminated, since repartitioning takes extra resources.

Here, the plan 300 includes a larger fact table 302 having rows to be processed against a smaller dimension table DIM2 304. The fact table 302 can be processed through a first repartition operator 306 (repartition operators depicted as circles), the output of which is passed to a first hash join (HJ) 308. Similarly, the dimension DIM2 304 is processed through a second repartition operator 310, the output of which is passed to the first hash join (HJ) 308. The output of the first hash join 308 can then be processed by a third repartition operator 312 as input to a second hash join 314. In other words, the output of the first hash join 308 can further be processed against a dimension DIM1 316. DIM1 316 can be partitioned using a fourth repartition operator 318 as another input to the second hash join 314. The output of the second hash join 314 can be partitioned using a fifth repartition operator 320 to a hash aggregation (HA) 322.

If the hash tables fit into memory, then no repartitioning of the data on the probe side of the hash join on multiprocessor machines is needed. Data can be simply fetched directly from another thread's memory. The crossed-out repartition operators (306 and 312) represent that these operators can be removed dynamically once it is determined that there is sufficient memory. The query plan 300 can then be modified to now include a local hash aggregator (not shown) at the output of hash join 314. This is beneficial with batch processing because moving batches through repartition operators is much slower (requires data repartitioning and thread context switching) compared to simply adding extra column(s) to the batch in the case of a 1-to-many join. The switch between query plans is performed at runtime because the available memory may not be known at compile time.

However, if the hash tables and associated dimensions, for example, do not fit into memory, the query plan 300 will be unchanged in order to provide repartitioning on the DIM and fact tables as needed.

The query plan 300 shows three marked parts: the first part 324, the second part 326, and the third part 328. By the time a query plan part is activated, it is ensured that the necessary information has been obtained about whether involved hash tables fit or do not fit into memory. In parallel plans, the query execution component (e.g., engine) has some flexibility in which parts of query plan 300 are activated, and in what order (e.g., bottom-up activation for parts of the plan 300 that have stop and go iterators). The activation sequence in the query plan 300 is the first part 324, followed by the second part 326, and then followed by the third part 328. Since, in this example, it is known that the hash tables for the dimensions will fit into system memory, the first and third repartition operators (306 and 312) can be removed, thereby improving performance of plan execution.

More specifically, during processing, the data from a dimension table is stored in a hash table which is stored in main memory. Row or column processing is then performed against the hash table in memory. If the hash table does not fit in memory, the data in the fact table 302 can be repartitioned and the processing is performed in pieces. However, if the hash table fits entirely into memory, then there is no need to repartition the fact table 302 as the hash table can be easily accessed by other threads in multiprocessing environments. Not having to repartition the data is especially performant with batch processing because moving batches across various threads is much slower.

Here, if DIM2 304 is small enough to fit into memory, a hash table can be created from DIM2 304 and stored in memory. Consider the case when the larger fact table 302 gets processed one row at a time. The process is to get a row from the fact table 302, perform a lookup in the DIM2 hashtable in memory to find any matching rows in DIM2 304, and if matches are found, output the matches. However, this will not work if DIM2 304 does not fit into memory. Similarly, if only half of DIM2 304 fits into memory, and if a row is selected from the fact table 302, the lookup in the hash table is performed, and no matches are found, it may be due to no actual matches being found, or because not all of DIM2 304 is in memory.

This problem is solved using the data repartitioning operators. For example, consider that DIM2 304 may be too large to fit into memory. DIM2 304 can be fit into memory if divided into smaller partitions each of which can fit separately or together with another partition (e.g., if more than two partitions) into memory when needed. Further consider that DIM2 304 can be efficiently moved into memory if divided into two partitions (using the second repartition operator 310): a partition zero and a partition one. The hash function is then applied to both partitions to create a hash table for each of partition zero and a partition one. When a row is obtained from the fact table 302 and run through the hash function, if the hash function returns zero, processing is directed to partition zero, and if the hash function returns a one, processing is directed to partition one.

This technique can also be applied to the fact table 302 using the first repartition operator 306. Thus, now there are two partitions for DIM2 304 and two partitions for the fact table 302. Now, take partition one from DIM2 304 and partition one of the fact table 302, and apply the first hash join 308 on these two inputs. This is because the smaller partition for DIM2 304 now resides in memory. All of the tuples in the partition one of DIM2 304 are in the partition one of the fact table 302 as well, due to the hash function. This process is repeated for the other partitions of DIM2 304 and the fact table 302.

Thus, the two repartition operators (306 and 308) represent significant extra work. If the size of DIM2 304 is unknown, or how much memory is available, it is unknown if the partitioning is required. At runtime, a check can be made to determine the need to repartition the data, and if not, eliminate the repartition operators (306 and 308). In other words, DIM2 304 can be attempted to be loaded into memory to determine if it will fit into available memory and then strip out the repartition operators (306 and 308) if loaded. Alternatively, if enough memory can be obtained to fit DIM2 304 into memory, the repartition operators (306 and 308) can then be stripped. This means that no partitioning has occurred for either the DIM2 304 or the fact table 302.

The point in execution to make this decision (remove operators) can be at the start of execution of the query or during execution. Where enough memory has been obtained, the repartition operators can be marked for removal, and then removed.

The point in execution to determine to strip (deactivate) the partition operators can be based on many factors such as execution start, the start loading DIM2 304 and when it is determined that not all of DIM2 304 will fit into memory.

As a general summary, the disclosed architecture handles mixed input from row or column data stores, operators take input data in either row format or column format for rows or columns, or output data in either row format or column format, and lastly, at runtime, determine that some repartition operators are not required.

When receiving data from a store, the operators of the given system are fixed in the format of the incoming data. However, the choice of output can be in row or column format. The join operator allows the output of data in either format, which flows into later operators. The output decision can be based on many factors. If the size of the output is large, than column (batch) is more efficient, but requires an operator that can process data into the desired output format.

If the system does not have an aggregator operator that is sufficiently flexible to output in column format, there is no choice, and the output is in row format. Thus, the decision of format to use between operators depends on several factors—availability of operators that can process in the format (as input, and consuming operator), amount of data, resources available (e.g., available memory (batch requires more)), etc.

Included herein is a set of flow charts representative of exemplary methodologies for performing novel aspects of the disclosed architecture. While, for purposes of simplicity of explanation, the one or more methodologies shown herein, for example, in the form of a flow chart or flow diagram, are shown and described as a series of acts, it is to be understood and appreciated that the methodologies are not limited by the order of acts, as some acts may, in accordance therewith, occur in a different order and/or concurrently with other acts from that shown and described herein. For example, those skilled in the art will understand and appreciate that a methodology could alternatively be represented as a series of interrelated states or events, such as in a state diagram. Moreover, not all acts illustrated in a methodology may be required for a novel implementation.

Figure 4:
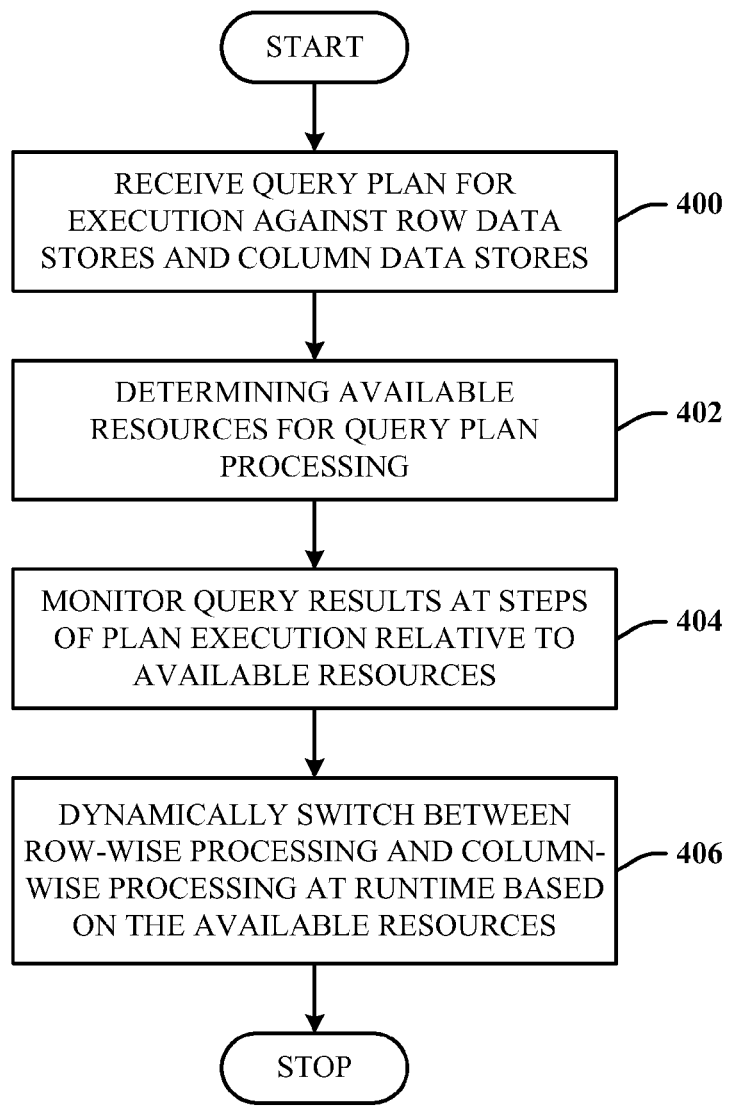
FIG. 4 illustrates a computer-implemented query method in accordance with the disclosed architecture.

FIG. 4 illustrates a computer-implemented query method in accordance with the disclosed architecture. At 400, a query plan is received for execution against row data stores and column data stores. At 402, available resources are determined for query plan processing. At 404, query results are monitored at steps of plan execution relative to the available resources. At 406, switching between row-wise processing and column-wise processing is performed dynamically at runtime based on the available resources.

Figure 5:
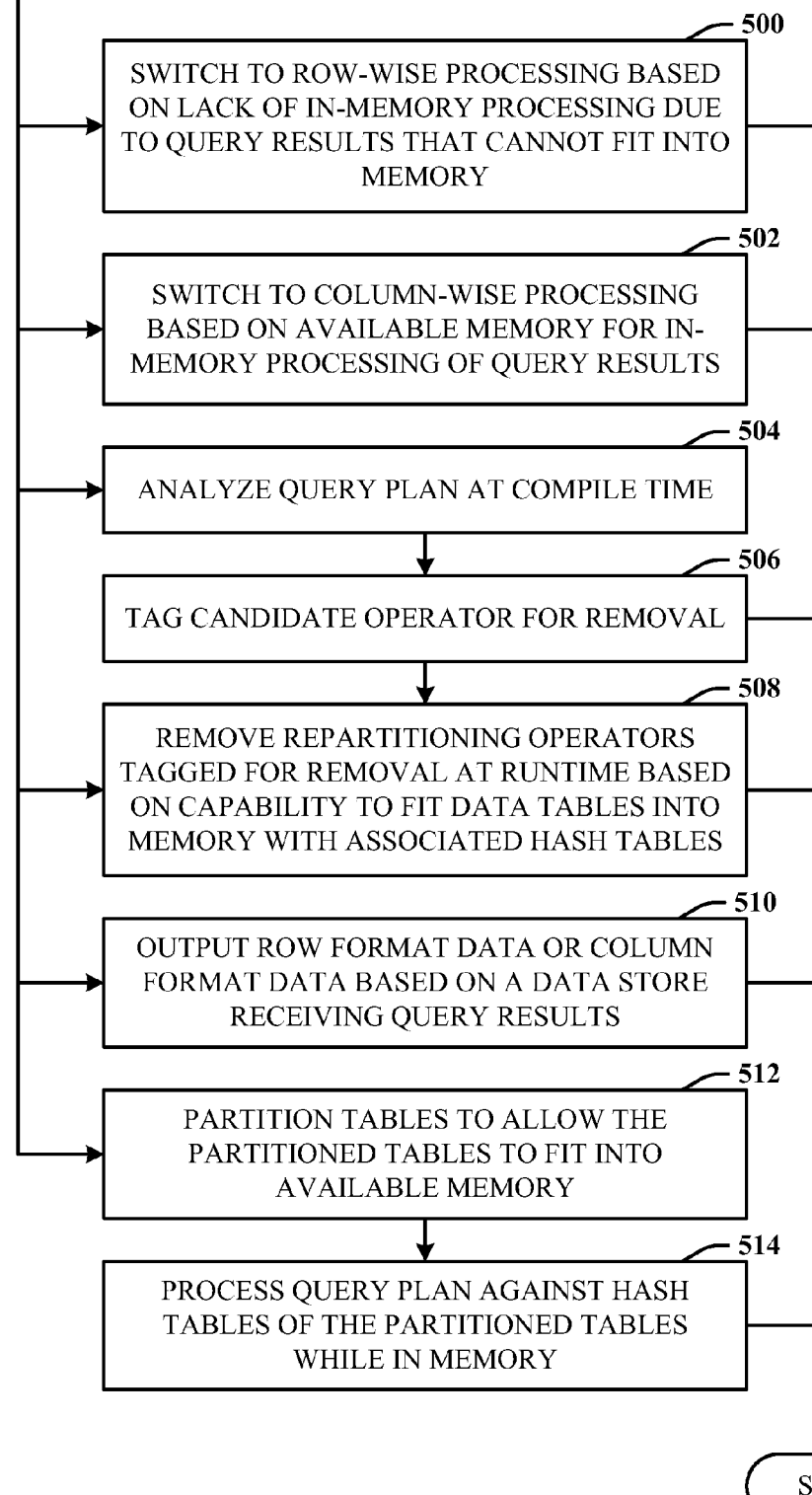
FIG. 5 illustrates further aspects of the method of FIG. 4.

FIG. 5 illustrates further aspects of the method of FIG. 4. At 500, row-wise processing is switched to based on lack of in-memory processing due to query results that cannot fit into memory. At 502, column-wise processing is switched to based on available memory for in-memory processing of query results. At 504, the query plan is analyzed at compile time. At 506, a candidate operator is tagged for removal. At 508, repartitioning operators tagged for removal are removed at runtime based on capability to fit data tables into memory with associated hash tables. At 510, row format data or column format data is output based on a data store receiving query results. At 512, tables are partitioned to allow the partitioned tables to fit into available memory. At 514, the query plan is processed against hash tables of the partitioned tables while in memory.

As used in this application, the terms "component" and "system" are intended to refer to a computer-related entity, either hardware, a combination of software and tangible hardware, software, or software in execution. For example, a component can be, but is not limited to, tangible components such as a processor, chip memory, mass storage devices (e.g., optical drives, solid state drives, and/or magnetic storage media drives), and computers, and software components such as a process running on a processor, an object, an executable, module, a thread of execution, and/or a program. By way of illustration, both an application running on a server and the server can be a component. One or more components can reside within a process and/or thread of execution, and a component can be localized on one computer and/or distributed between two or more computers. The word "exemplary" may be used herein to mean serving as an example, instance, or illustration. Any aspect or design described herein as "exemplary" is not necessarily to be construed as preferred or advantageous over other aspects or designs.

Figure 6:
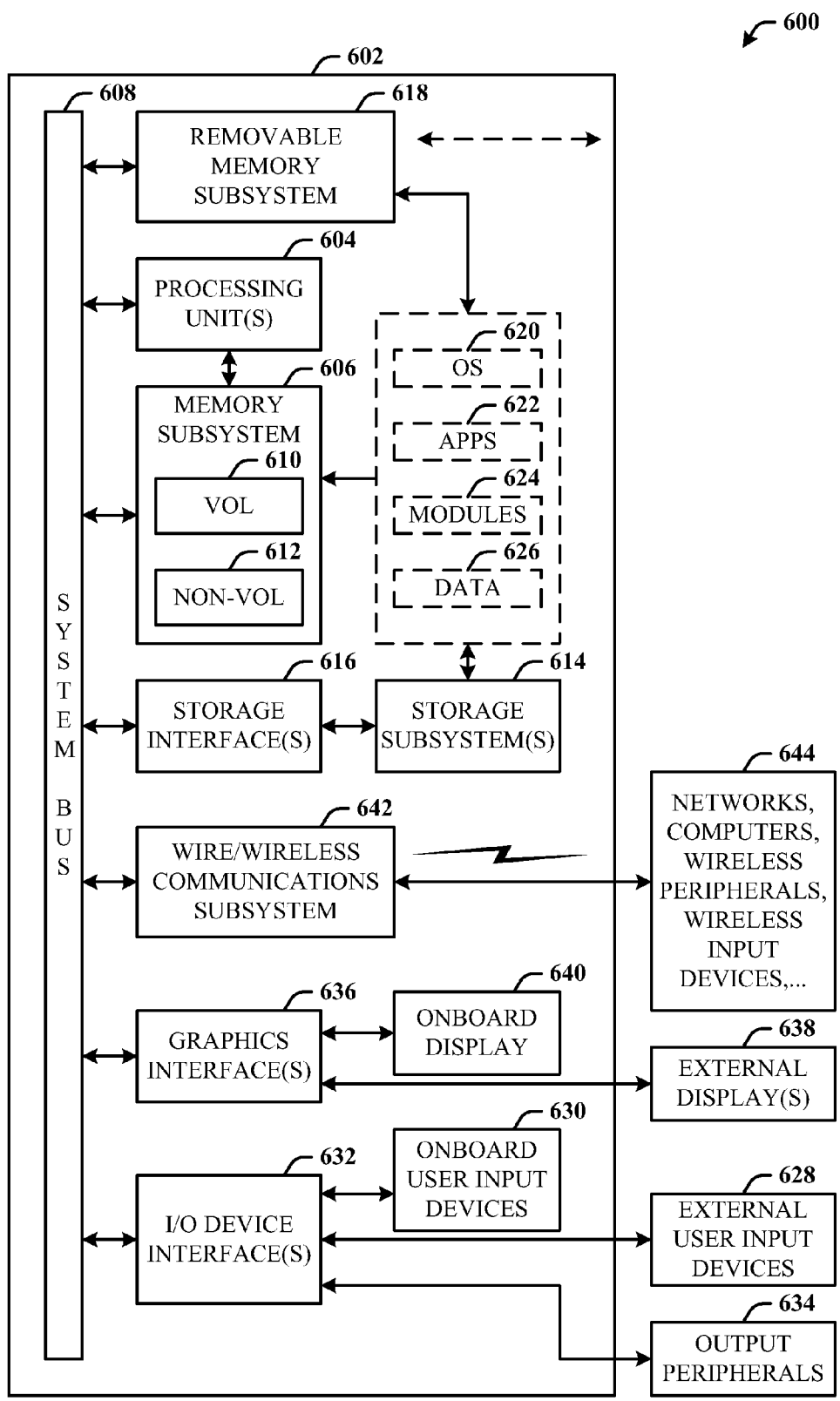
FIG. 6 illustrates a block diagram of a computing system that executes adaptive mode processing in accordance with the disclosed architecture.

Referring now to FIG. 6, there is illustrated a block diagram of a computing system 600 that executes adaptive mode processing in accordance with the disclosed architecture. In order to provide additional context for various aspects thereof, FIG. 6 and the following description are intended to provide a brief, general description of the suitable computing system 600 in which the various aspects can be implemented. While the description above is in the general context of computer-executable instructions that can run on one or more computers, those skilled in the art will recognize that a novel embodiment also can be implemented in combination with other program modules and/or as a combination of hardware and software.

The computing system 600 for implementing various aspects includes the computer 602 having processing unit(s) 604, a computer-readable storage such as a system memory 606, and a system bus 608. The processing unit(s) 604 can be any of various commercially available processors such as single-processor, multi-processor, single-core units and multi-core units. Moreover, those skilled in the art will appreciate that the novel methods can be practiced with other computer system configurations, including minicomputers, mainframe computers, as well as personal computers (e.g., desktop, laptop, etc.), hand-held computing devices, microprocessor-based or programmable consumer electronics, and the like, each of which can be operatively coupled to one or more associated devices.

The system memory 606 can include computer-readable storage (physical storage media) such as a volatile (VOL) memory 610 (e.g., random access memory (RAM)) and non-volatile memory (NON-VOL) 612 (e.g., ROM, EPROM, EEPROM, etc.). A basic input/output system (BIOS) can be stored in the non-volatile memory 612, and includes the basic routines that facilitate the communication of data and signals between components within the computer 602, such as during startup. The volatile memory 610 can also include a high-speed RAM such as static RAM for caching data.

The system bus 608 provides an interface for system components including, but not limited to, the system memory 606 to the processing unit(s) 604. The system bus 608 can be any of several types of bus structure that can further interconnect to a memory bus (with or without a memory controller), and a peripheral bus (e.g., PCI, PCIe, AGP, LPC, etc.), using any of a variety of commercially available bus architectures.

The computer 602 further includes machine readable storage subsystem(s) 614 and storage interface(s) 616 for interfacing the storage subsystem(s) 614 to the system bus 608 and other desired computer components. The storage subsystem(s) 614 (physical storage media) can include one or more of a hard disk drive (HDD), a magnetic floppy disk drive (FDD), and/or optical disk storage drive (e.g., a CD-ROM drive DVD drive), for example. The storage interface(s) 616 can include interface technologies such as EIDE, ATA, SATA, and IEEE 1394, for example.

One or more programs and data can be stored in the memory subsystem 606, a machine readable and removable memory subsystem 618 (e.g., flash drive form factor technology), and/or the storage subsystem(s) 614 (e.g., optical, magnetic, solid state), including an operating system 620, one or more application programs 622, other program modules 624, and program data 626.

The one or more application programs 622, other program modules 624, and program data 626 can include the entities and components of the system 100 of FIG. 1, the entities and components of the system 200 of FIG. 2, the entities and components of the query plan 300 of FIG. 3, the entities and components of the query plan 400 of FIG. 4, and the methods represented by the flowcharts of FIGS. 4 and 5, for example.

Generally, programs include routines, methods, data structures, other software components, etc., that perform particular tasks or implement particular abstract data types. All or portions of the operating system 620, applications 622, modules 624, and/or data 626 can also be cached in memory such as the volatile memory 610, for example. It is to be appreciated that the disclosed architecture can be implemented with various commercially available operating systems or combinations of operating systems (e.g., as virtual machines).

The storage subsystem(s) 614 and memory subsystems (606 and 618) serve as computer readable media for volatile and non-volatile storage of data, data structures, computer-executable instructions, and so forth. Computer readable media can be any available media that can be accessed by the computer 602 and includes volatile and non-volatile internal and/or external media that is removable or non-removable. For the computer 602, the media accommodate the storage of data in any suitable digital format. It should be appreciated by those skilled in the art that other types of computer readable media can be employed such as zip drives, magnetic tape, flash memory cards, flash drives, cartridges, and the like, for storing computer executable instructions for performing the novel methods of the disclosed architecture.

A user can interact with the computer 602, programs, and data using external user input devices 628 such as a keyboard and a mouse. Other external user input devices 628 can include a microphone, an IR (infrared) remote control, a joystick, a game pad, camera recognition systems, a stylus pen, touch screen, gesture systems (e.g., eye movement, head movement, etc.), and/or the like. The user can interact with the computer 602, programs, and data using onboard user input devices 630 such a touchpad, microphone, keyboard, etc., where the computer 602 is a portable computer, for example. These and other input devices are connected to the processing unit(s) 604 through input/output (I/O) device interface(s) 632 via the system bus 608, but can be connected by other interfaces such as a parallel port, IEEE 1394 serial port, a game port, a USB port, an IR interface, etc. The I/O device interface(s) 632 also facilitate the use of output peripherals 634 such as printers, audio devices, camera devices, and so on, such as a sound card and/or onboard audio processing capability.

One or more graphics interface(s) 636 (also commonly referred to as a graphics processing unit (GPU)) provide graphics and video signals between the computer 602 and external display(s) 638 (e.g., LCD, plasma) and/or onboard displays 640 (e.g., for portable computer). The graphics interface(s) 636 can also be manufactured as part of the computer system board.

The computer 602 can operate in a networked environment (e.g., IP-based) using logical connections via a wired/wireless communications subsystem 642 to one or more networks and/or other computers. The other computers can include workstations, servers, routers, personal computers, microprocessor-based entertainment appliances, peer devices or other common network nodes, and typically include many or all of the elements described relative to the computer 602. The logical connections can include wired/wireless connectivity to a local area network (LAN), a wide area network (WAN), hotspot, and so on. LAN and WAN networking environments are commonplace in offices and companies and facilitate enterprise-wide computer networks, such as intranets, all of which may connect to a global communications network such as the Internet.

When used in a networking environment the computer 602 connects to the network via a wired/wireless communication subsystem 642 (e.g., a network interface adapter, onboard transceiver subsystem, etc.) to communicate with wired/wireless networks, wired/wireless printers, wired/wireless input devices 644, and so on. The computer 602 can include a modem or other means for establishing communications over the network. In a networked environment, programs and data relative to the computer 602 can be stored in the remote memory/storage device, as is associated with a distributed system. It will be appreciated that the network connections shown are exemplary and other means of establishing a communications link between the computers can be used.

The computer 602 is operable to communicate with wired/wireless devices or entities using the radio technologies such as the IEEE 802.xx family of standards, such as wireless devices operatively disposed in wireless communication (e.g., IEEE 802.11 over-the-air modulation techniques) with, for example, a printer, scanner, desktop and/or portable computer, personal digital assistant (PDA), communications satellite, any piece of equipment or location associated with a wirelessly detectable tag (e.g., a kiosk, news stand, restroom), and telephone. This includes at least Wi-Fi (or Wireless Fidelity) for hotspots, WiMax, and Bluetooth™ wireless technologies. Thus, the communications can be a predefined structure as with a conventional network or simply an ad hoc communication between at least two devices. Wi-Fi networks use radio technologies called IEEE 802.11x (a, b, g, etc.) to provide secure, reliable, fast wireless connectivity. A Wi-Fi network can be used to connect computers to each other, to the Internet, and to wire networks (which use IEEE 802.3-related media and functions).

What has been described above includes examples of the disclosed architecture. It is, of course, not possible to describe every conceivable combination of components and/or methodologies, but one of ordinary skill in the art may recognize that many further combinations and permutations are possible. Accordingly, the novel architecture is intended to embrace all such alterations, modifications and variations that fall within the spirit and scope of the appended claims. Furthermore, to the extent that the term "includes" is used in either the detailed description or the claims, such term is intended to be inclusive in a manner similar to the term "comprising" as "comprising" is interpreted when employed as a transitional word in a claim.

What is claimed is:

1. A computer-implemented query system having a physical storage media, comprising:
    a query plan for execution against data stores that include row data stores and column data stores; and
    a query execution component that controls execution of the query plan to switch between row-wise processing and column-wise processing based on the data stores accessed as part of query plan execution, row-wise processing including processing a plurality of rows one at a time and column-wise processing including processing another plurality of rows as one batch, the query execution component being configured to switch from row-wise processing to column-wise processing and the query execution component being configured to switch from column-wise processing to row-wise processing.

2. The system of claim 1, wherein the query execution component switches between row-wise processing and column-wise processing during plan execution to output query results in a column format.

3. The system of claim 1, wherein the query execution component switches between row-wise processing and column-wise processing during plan execution to output query results in a row format.

4. The system of claim 1, wherein the query execution component dynamically modifies the query plan or removes an operator in the query plan at runtime based on an amount of data associated with query plan execution at stages of execution.

5. The system of claim 1, wherein the query execution component defaults to row-wise processing of the query plan and switches to column-wise processing based on data storage format of the data stores accessed as part of processing the query plan.

6. The system of claim 1, wherein the query execution component modifies an operator of the query plan to optimize query execution performance for a given data store.

7. The system of claim 1, wherein the query execution component analyzes the query execution plan after compilation to identify one or more query operators for removal.

8. The system of claim 1, wherein the query execution component determines memory capabilities to execute the query plan in memory and switches between query plans based on available memory.

9. The system of claim 1, wherein the query plan is modified to remove one or more repartitioning operators based on data tables and associated hash tables fitting into memory.

10. A computer-implemented query system having a physical storage media, comprising:
a query plan for execution against data stores that include row data stores and column data stores; and
a query execution component that controls execution of the query plan to switch between row-wise processing and column-wise processing at runtime based on a determination of available memory made at runtime as part of query plan execution, the query execution component defaults to row-wise processing of the query plan and switches to column-wise processing based on memory available to accommodate column-wise processing of the query plan, row-wise processing including processing a plurality of rows one at a time and column-wise processing including processing another plurality of rows as one batch, the query execution component being configured to switch from row-wise processing to column-wise processing and the query execution component being configured to switch from column-wise processing to row-wise processing.

11. The system of claim 10, wherein the query execution component switches between row-wise processing and column-wise processing during plan execution to output query results in a column format or a row format.

12. The system of claim 10, wherein the query execution component dynamically modifies the query plan or removes an operator in the query plan at runtime based on an amount of data associated with query plan execution at stages of execution.

13. The system of claim 10, wherein the query execution component analyzes the query execution plan after compilation to identify one or more query operators for removal, and removes one or more repartitioning operators based on data tables and associated hash tables fitting into memory.

14. A computer-implemented query method executable via a processor and memory, comprising:
receiving a query plan for execution against row data stores and column data stores;
determining available resources for query plan processing;
monitoring query results at steps of plan execution relative to the available resources;
dynamically switching between row-wise processing and column-wise processing at runtime based on the available resources, dynamically switching between row-wise processing and column-wise processing at runtime including switching between row-wise processing and column-wise processing at a start of execution; and
processing a modified query plan using a first thread, processing the modified query plan including fetching one or more data items from a memory space used by a second thread.

15. The method of claim 14, further comprising switching to row-wise processing based on lack of in-memory processing due to query results that cannot fit into memory.

16. The method of claim 14, further comprising switching to column-wise processing based on available memory for in-memory processing of query results.

17. The method of claim 14, further comprising:
analyzing the query plan at compile time; and
tagging a candidate operator for removal.

18. The method of claim 17, further comprising removing repartitioning operators tagged for removal at runtime based on capability to fit data tables into memory with associated hash tables.

19. The method of claim 14, further comprising outputting row format data or column format data based on a data store receiving query results.

20. The method of claim 14, further comprising:
partitioning tables to allow the partitioned tables to fit into available memory; and
processing the query plan against hash tables of the partitioned tables while in memory.

* * * * *